United States Patent
Han et al.

(10) Patent No.: US 11,961,270 B2
(45) Date of Patent: Apr. 16, 2024

(54) AIR SCREEN DETECTOR DEVICE

(71) Applicant: ELECTRONICS AND TELECOMMUNICATIONS RESEARCH INSTITUTE, Daejeon (KR)

(72) Inventors: Sang-Pil Han, Seoul (KR); Jaegyu Park, Daejeon (KR); Sungil Kim, Daejeon (KR); Minhyup Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 387 days.

(21) Appl. No.: 17/507,789

(22) Filed: Oct. 21, 2021

(65) Prior Publication Data

US 2022/0180111 A1    Jun. 9, 2022

(30) Foreign Application Priority Data

Dec. 7, 2020   (KR) .................. 10-2020-0169570
Jan. 20, 2021  (KR) .................. 10-2021-0008113

(51) Int. Cl.
   *G06F 3/01*       (2006.01)
   *G06V 10/147*     (2022.01)

(52) U.S. Cl.
   CPC ............ *G06V 10/147* (2022.01); *G06F 3/011* (2013.01)

(58) Field of Classification Search
   None
   See application file for complete search history.

(56) References Cited

U.S. PATENT DOCUMENTS

| | | | |
|---|---|---|---|
| 8,378,995 B2 * | 2/2013 | Yuan | G06F 3/0428 |
| | | | 345/175 |
| 9,176,559 B2 * | 11/2015 | Oh | G06F 3/0428 |
| 2010/0128937 A1 | 5/2010 | Yoo et al. | |
| 2010/0177035 A1 | 7/2010 | Schowengerdt et al. | |
| 2014/0066781 A1 | 3/2014 | Park et al. | |
| 2018/0120932 A1 | 5/2018 | Sengelaub et al. | |

FOREIGN PATENT DOCUMENTS

| | | |
|---|---|---|
| KR | 100894544 B1 | 4/2009 |
| KR | 20100075281 A | 7/2010 |
| KR | 1020150110362 A | 10/2015 |
| KR | 20170136582 A | 12/2017 |
| KR | 20180122811 A | 11/2018 |
| KR | 20180135649 A | 12/2018 |
| KR | 101935572 B1 | 1/2019 |
| KR | 20190041349 A | 4/2019 |

* cited by examiner

*Primary Examiner* — Dov Popovici
(74) *Attorney, Agent, or Firm* — Rabin & Berdo, P.C.

(57) ABSTRACT

Disclosed is an air screen detector device. The air screen detector device includes a display for displaying an air screen image in one direction by using visible light, an infrared light source disposed on the display to provide infrared light in the same direction as that of the visible light, an infrared image sensor disposed on one side of the display and the infrared light source to receive the infrared light reflected by a finger provided in the air screen image disposed on the other side of the infrared light source, a first multifocal lens disposed between the infrared image sensor and the infrared light source to provide the infrared light to the infrared image sensor, and a visible light filter disposed between the first multifocal lens and the infrared image sensor to remove the visible light.

11 Claims, 10 Drawing Sheets

AIR SCREEN DETECTOR DEVICE

CROSS-REFERENCE TO RELATED APPLICATIONS

This U.S. non-provisional patent application claims priority under 35 U.S.C. § 119 of Korean Patent Application Nos. 10-2020-0169570, filed on Dec. 7, 2020, and 10-2021-0008113, filed on Jan. 20, 2021, the entire contents of which are hereby incorporated by reference.

BACKGROUND

The present disclosure herein relates to a detector device, and more particularly, to an air screen detector device.

In recent years, a human-machine smart interface technology capable of projecting a three-dimensional image without an assistant device such as a goggle, a head mounted display (HMD), and a glove and mutually recognizing and reacting anytime anywhere has been developed. A human-machine smart interface device is an interactive input and output device for displaying a screen of a computer, a TV, and a DVD by using a laser beam or controlling through a finger instead of a mouse.

SUMMARY

The present disclosure provides an air screen detector device capable of obtaining a number touched by a finger in a non-contact and/or untact method.

An embodiment of the inventive concept provides an air screen detector device including: a display for displaying an air screen image in one direction by using visible light; an infrared light source disposed on the display to provide infrared light in the same direction as that of the visible light; an infrared image sensor disposed on one side of the display and the infrared light source to receive the infrared light reflected by a finger provided in the air screen image disposed on the other side of the infrared light source; a first multifocal lens disposed between the infrared image sensor and the infrared light source to provide the infrared light to the infrared image sensor; and a visible light filter disposed between the first multifocal lens and the infrared image sensor to remove the visible light.

In an embodiment, the display may have display areas, and the infrared light source may be disposed between the display areas.

In an embodiment, the infrared light source may have holes for individually exposing the display areas.

In an embodiment, the infrared light source may have a net shape including the holes.

In an embodiment, the air screen detector device may further include a beam splitter disposed between the visible light filter and the first multifocal lens or between the first multifocal lens and the infrared light source.

In an embodiment, the air screen detector device may further include a second multifocal lens disposed between the beam splitter and the display.

In an embodiment, the beam splitter may be disposed between the second multifocal lens and the display.

In an embodiment, the air screen detector device may further include a mirror disposed on one side of the second multifocal lens, which is opposite to the beam splitter, to reflect the visible light to the second multifocal lens.

In an embodiment, the display, the infrared light source, the first multifocal lens, and the second multifocal lens may surround the beam splitter in all directions.

In an embodiment, the air screen detector device may further include: a first ultrasonic sensor for detecting a user within a first distance; and a second ultrasonic sensor disposed between the first ultrasonic sensor and the infrared light source to detect the finger of the user within a second distance less than the first distance.

In an embodiment, the air screen detector device may further include: an amplifier connected to the infrared image sensor; and a signal processor connected to the amplifier.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
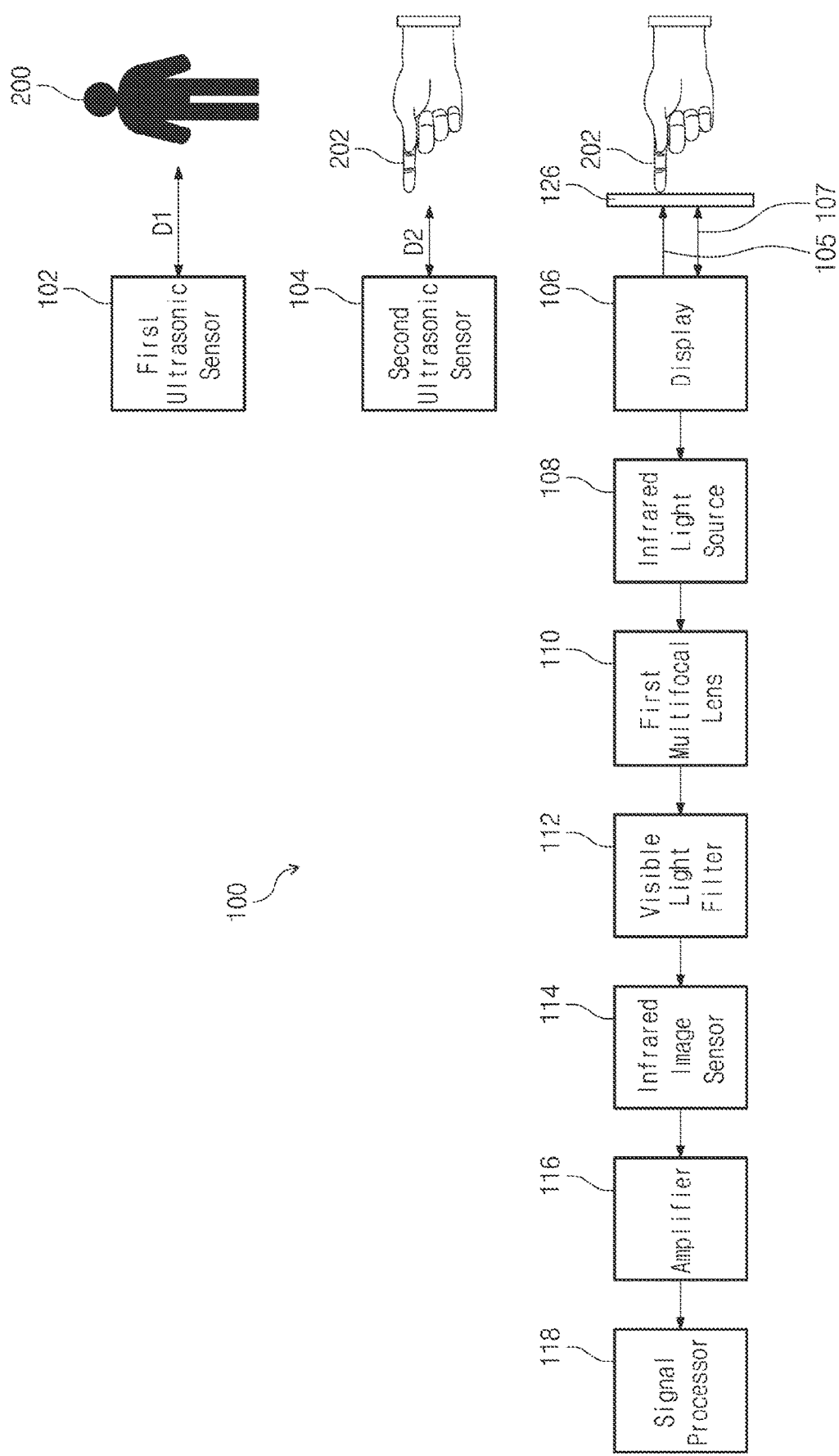
FIGS. 1 and 2 are a block diagram and a cross-sectional view illustrating an example of an air screen detector device according to an embodiment of the inventive concept.

Hereinafter, exemplary embodiments of the present invention will be described in detail with reference to the accompanying drawings. Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present disclosure is only defined by scopes of claims. Like reference numerals refer to like elements throughout.

In the specification, the technical terms are used only for explaining a specific exemplary embodiment while not limiting the present invention. The terms of a singular form may include plural forms unless referred to the contrary. The meaning of 'comprises' and/or 'comprising' specifies a component, a step, an operation and/or an element does not exclude other components, steps, operations and/or elements. Also, it will be understood that each of a light source, a display, a lens, and a sensor used in this specification has a meaning generally used in the optical field. Since preferred embodiments are provided below, the order of the reference numerals given in the description is not limited thereto.

Figure 2:
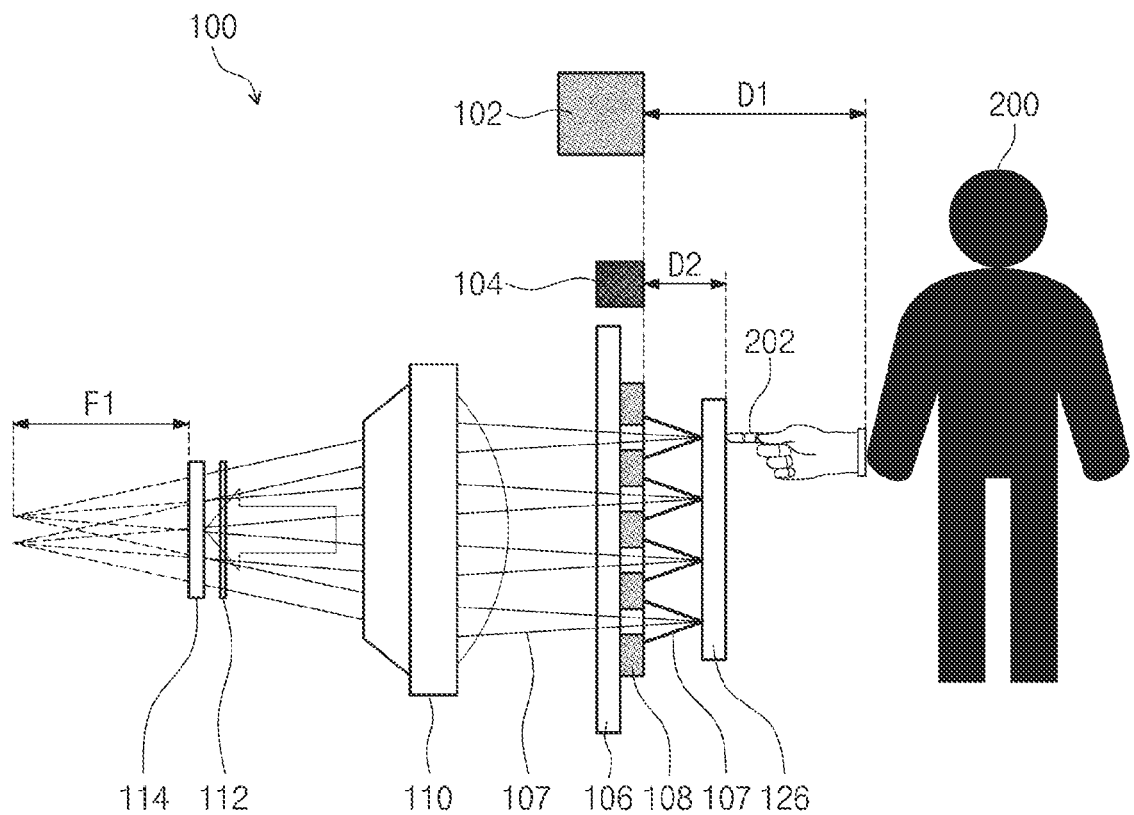

FIGS. 1 and 2 are a block diagram and a cross-sectional view illustrating an example of an air screen detector device 100 according to an embodiment of the inventive concept.

Referring to FIGS. 1 and 2, the air screen detector device 100 according to an embodiment of the inventive concept may be a non-contact type air screen detector device. For example, the air screen detector device 100 may include a first ultrasonic sensor 102, a second ultrasonic sensor 104, a display 106, an infrared light source 108, a first multifocal lens 110, a visible light filter 112, an infrared image sensor 114, an amplifier 116, and a signal processor 118.

The first ultrasonic sensor 102 may be spaced apart from the display 106 and the infrared light source 108. Although not shown, the first ultrasonic sensor 102 may be disposed on a door of a structure or an upper wall of an elevator entrance. Also, the first ultrasonic sensor 102 may be disposed on a ceiling wall in a structure. However, the embodiment of the inventive concept is not limited thereto. The first ultrasonic sensor 102 may recognize a user 200. For example, the first ultrasonic sensor 102 may detect the user 200 within a first distance D1 of about 1 m to about 10 m.

The second ultrasonic sensor 104 may be disposed between the display 106 and the first ultrasonic sensor 102. The second ultrasonic sensor 104 may be disposed adjacent to the display 106. Although not shown, the second ultrasonic sensor 104 may be disposed on a door a sidewall of an elevator entrance. Also, the second ultrasonic sensor 104 may be disposed on a door of a vehicle. However, the embodiment of the inventive concept is not limited thereto. The second ultrasonic sensor 104 may detect a finger 202 of the user 200. For example, the second ultrasonic sensor 104 may detect the finger 202 of the user 200 within a second distance D2 of about 1 cm to about 1 m.

The display 106 may fix and/or support the infrared light source 108. When the finger 202 of the user 200 disposed in front of the display 106, the display 106 may provide visible light 105 in a direction toward the finger 202. For example, the display 106 may include a liquid crystal display device. Also, the display 106 may include holographic image device. However, the embodiment of the inventive concept is not limited thereto. The visible light 105 may include white light and/or a laser beam having a wavelength of about 400 nm to about 700 nm.

Figure 3:
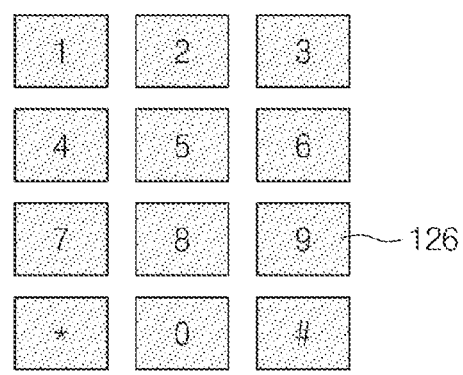
FIG. 3 is a plan view illustrating an example of an air screen image generated by a display of FIG. 2.

FIG. 3 is a plan view illustrating an example of an air screen image 126 generated by the display 106 of FIG. 2.

Referring to FIGS. 1 to 3, the display 106 may display the air screen image 126 in one direction by using the visible light 105. The air screen image 126 may be displayed while being separated from a top surface of the infrared light source 108. The air screen image 126 may include a hologram image. The air screen image 126 may display numbers and/or symbols. For example, the air screen image 126 may display numbers of 0 to 9 and symbols of * and #.

Referring to FIGS. 1 and 2, the infrared light source 108 may be disposed on the display 106. For example, the infrared light source 108 may be an infrared lighting device. The infrared light source 108 may provide infrared light 107 in the same direction as that of the visible light 105. The infrared light source 108 may block the infrared light 107 in a direction toward the display 106. For example, the infrared light source 108 may be an infrared laser device. The infrared light 107 may include a laser beam having a wavelength of about 800 nm to about 2500 nm.

Figure 4A:
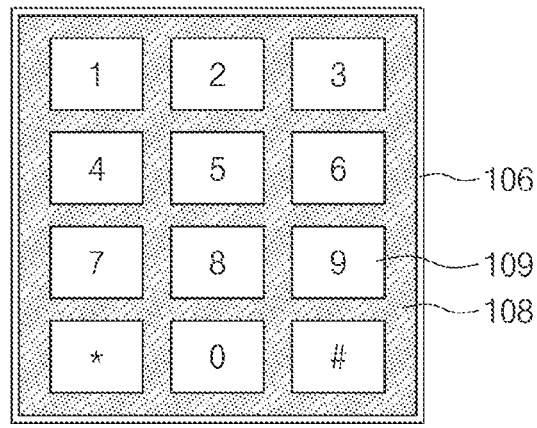
FIGS. 4A to 4C are plan views illustrating an example of the display and an infrared light source of FIG. 2.
Figure 4B:
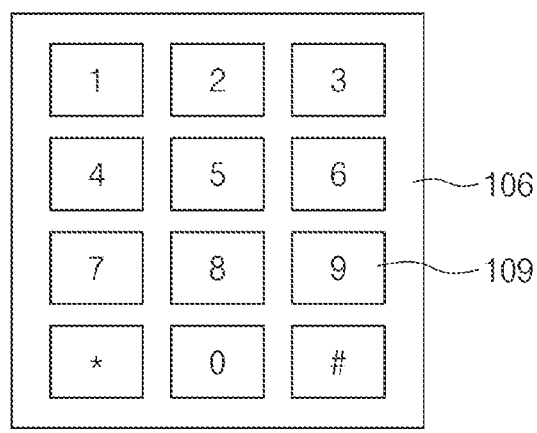
Figure 4C:
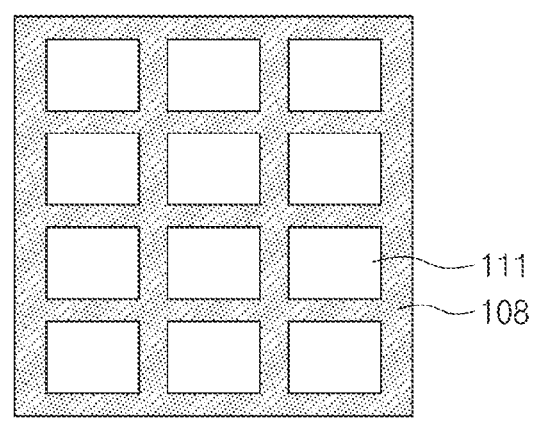

FIGS. 4A to 4C are plan views each illustrating an example of the display 106 and the infrared light source 108 of FIG. 2.

Referring to FIG. 4A, the display 106 may have display areas 109, and the infrared light source 108 may be disposed between the display areas 109 and/or disposed on an outside of the display areas 109.

Referring to FIG. 4B, each of the display areas 109 may display a number key and/or a symbol. Each of the display areas 109 may have a rectangular shape. The display areas 109 may be arranged in a matrix form of 3×4. The display areas 109 may display numbers of 0 to 9 and symbols of * and #.

Referring to FIG. 4C, the infrared light source 108 a net shape and/or a lattice shape. For example, the infrared light source 108 may have holes 111. The holes 111 may individually expose the display areas 109. Each of the holes 111 may have the same shape as that of each of the display areas 109. For example, each of the holes 111 may have a rectangular shape.

Referring to FIGS. 1 and 2 again, the infrared light 107 may be provided to the finger 202 and then reflected by the finger 202. The infrared light 107 may pass through the holes 111 of the infrared light source 108 and the display areas 109 of the display 106 and be provided to the first multifocal lens 110, the visible light filter 112, and the infrared image sensor 114.

The first multifocal lens 110 may be disposed between the display 106 and the infrared image sensor 114. The first multifocal lens 110 may project the infrared light 107 to the infrared image sensor 114. The first multifocal lens 110 may project the infrared light 107 to a plurality of focuses based on the display areas 109.

The visible light filter 112 may be disposed between the first multifocal lens 110 and the infrared image sensor 114. The visible light filter 112 may transmit the infrared light 107 therethrough and remove and/or block the visible light 105.

The infrared image sensor 114 may be disposed on one side of the visible light filter 112. The infrared image sensor 114 may be disposed between focuses of the first multifocal lens 110 and the visible light filter 112. The infrared image sensor 114 may be spaced apart by a reception distance F1 of about 1 mm to about 10 cm from the focuses of the first multifocal lens 110. The infrared image sensor 114 may receive the infrared light 107 to obtain an image signal of the finger 202. The infrared image sensor 114 may include a group II-VI compound semiconductor sensor array. Alternatively, the infrared image sensor 114 may include a group IV silicon or germanium sensor array.

The amplifier 116 may be connected to the infrared image sensor 114. The amplifier 116 may amplify an image signal.

The signal processor 118 may be connected to the amplifier 116. The signal processor 118 may analyze the image signal. That is, the signal processor 118 may use the image signal to determine numbers and/or symbols touched by the finger 202 (hereinafter, referred to as touched numbers and touched symbols of the finger 202).

Thus, the air screen detector device 100 according to an embodiment of the inventive concept may obtain the touched number of the finger in a non-contact method by using the first multifocal lens 110, the visible light filter 112, and the infrared image sensor 114.

Figure 5:
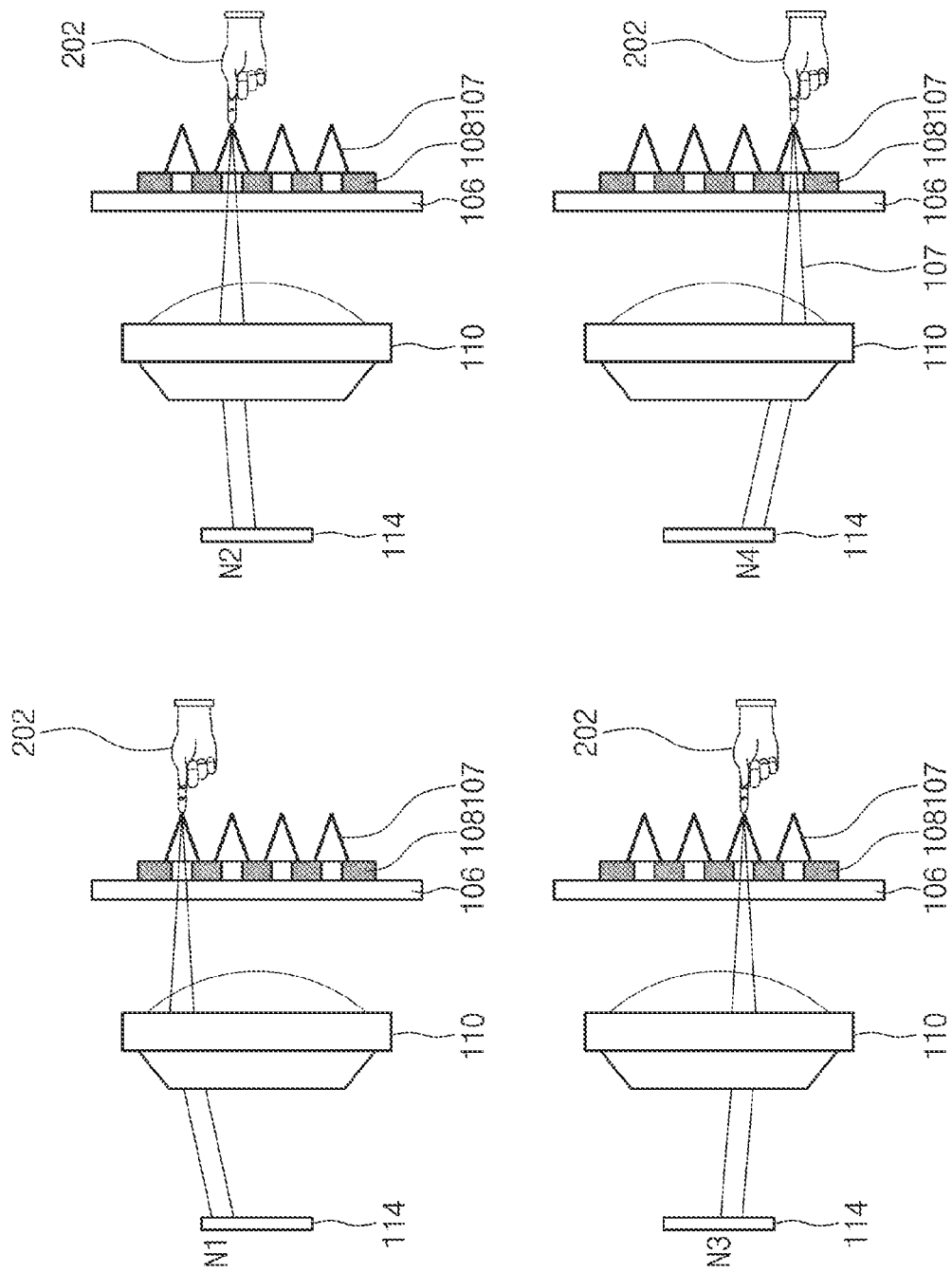
FIG. 5 is cross-sectional views illustrating an imaging location of infrared light on an infrared light sensor based on a position of a finger provided on display areas of FIG. 4A.

FIG. 5 is a cross-sectional views illustrating an imaging location of the infrared light 107 on the infrared image sensor 114 based on a position of the finger 202 provided on the display areas 109 of FIG. 4A. In FIG. 5, the air screen image 126 is omitted for more exact explanation.

Referring to FIGS. 4A and 5, the imaging location of the infrared light 107 on the infrared image sensor 114 may be varied according to the position of the finger 202 provided on the display areas 109. When the finger 202 is provided on one of 1, 2, or 3 of the display areas 109, the first multifocal lens 110 may provide the infrared light 107 to a top portion N1 of the infrared image sensor 114. The infrared light 107 may be imaged to the top portion N1 of the infrared image sensor 114.

When the finger 202 is provided on one of 4, 5, or 6 of the display areas 109, the infrared light 107 may be provided to a middle top portion N2 of the infrared image sensor 114.

When the finger 202 is provided on one of 7, 8, or 9 of the display areas 109, the infrared light 107 may be provided to a middle portion N3 of the infrared image sensor 114.

When the finger 202 is provided on one of *, 0, or # of the display areas 109, the infrared light 107 may be provided to a bottom portion N4 of the infrared image sensor 114.

Figure 6A:
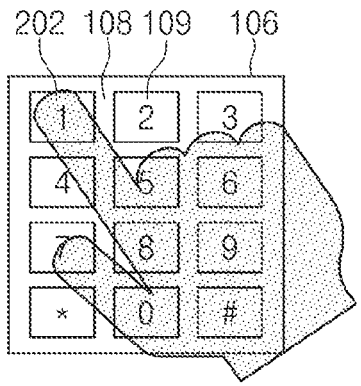
FIGS. 6A to 6C are plan views illustrating the finger provided on the display areas of 1, 2, and 3 of FIG. 4A.
Figure 6B:
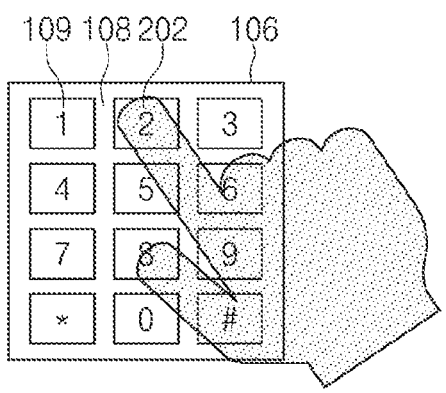
Figure 6C:
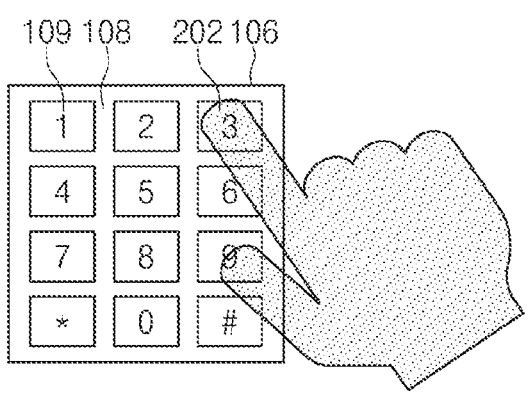
Figure 7A:
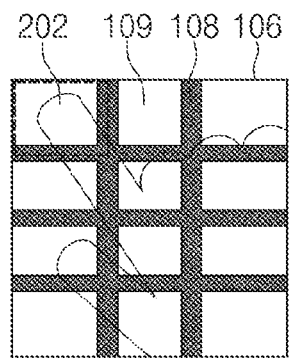
FIGS. 7A to 7C are images illustrating positions of the finger of FIGS. 6A to 6C.
Figure 7B:
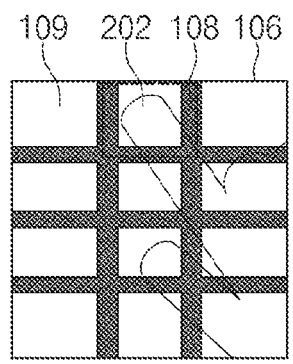
Figure 7C:
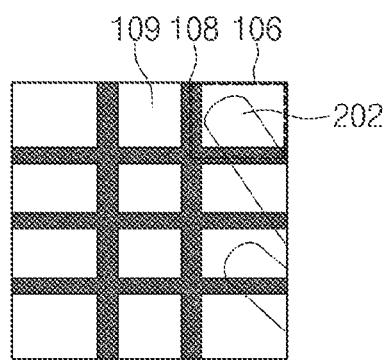

FIGS. 6A to 6C are plan views illustrating the finger 202 provided on the display areas 109 of the 1, 2, and 3 of FIG. 4A. FIGS. 7A to 7C are images illustrating positions of the finger 202 of FIGS. 6A to 6C.

Referring to FIGS. 6A to 6C and 7A to 7C, when the index finger 202 is provided on the display areas 109, the signal processor 118 may determine the touched number and the touched symbol corresponding to the position of the finger 202. For example, the signal processor 118 may determine touched number and the touched symbol corresponding to the position of the index finger 202 by using a software algorithm and/or artificial intelligence (AI). Alternatively, the signal processor 118 may compare an image of the index finger 202 with a pre-stored image to determine the touched number. However, the embodiment of the inventive concept is not limited thereto.

Referring to FIGS. 6A and 7A, when the index finger 202 is provided on the display area 109 of the 1, the signal processor 118 may determine the touched number and the touched symbol of the 1 by using a detection signal of the infrared light 107. For example, the detection signal of the finger 202 may be represented by a contour and/or an outline or represented by a grey color. However, the embodiment of the inventive concept is not limited thereto.

Referring to FIGS. 6B and 7B, when the index finger 202 is provided on the display area 109 of the 2, the signal processor 118 may determine the touched number of the 2 by using the detection signal of the infrared light 107.

Referring to FIGS. 6C and 7C, when the index finger 202 is provided on the display area 109 of the 3, the signal processor 118 may determine the touched number of the 3 by using the detection signal of the infrared light 107.

Figure 8:
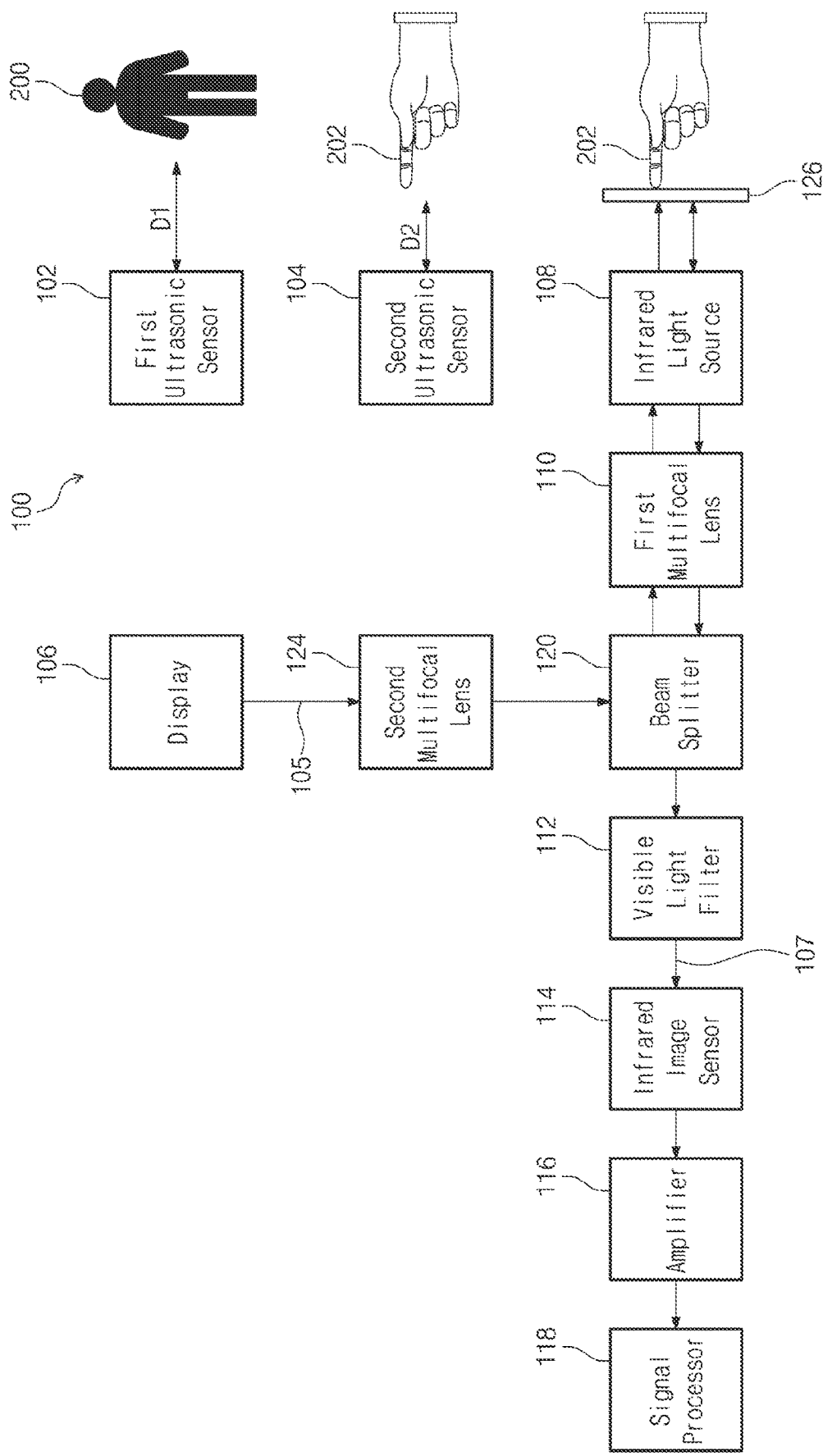
FIGS. 8 and 9 are a block diagram and a cross-sectional view illustrating an example of the air screen detector device according to an embodiment of the inventive concept.
Figure 9:
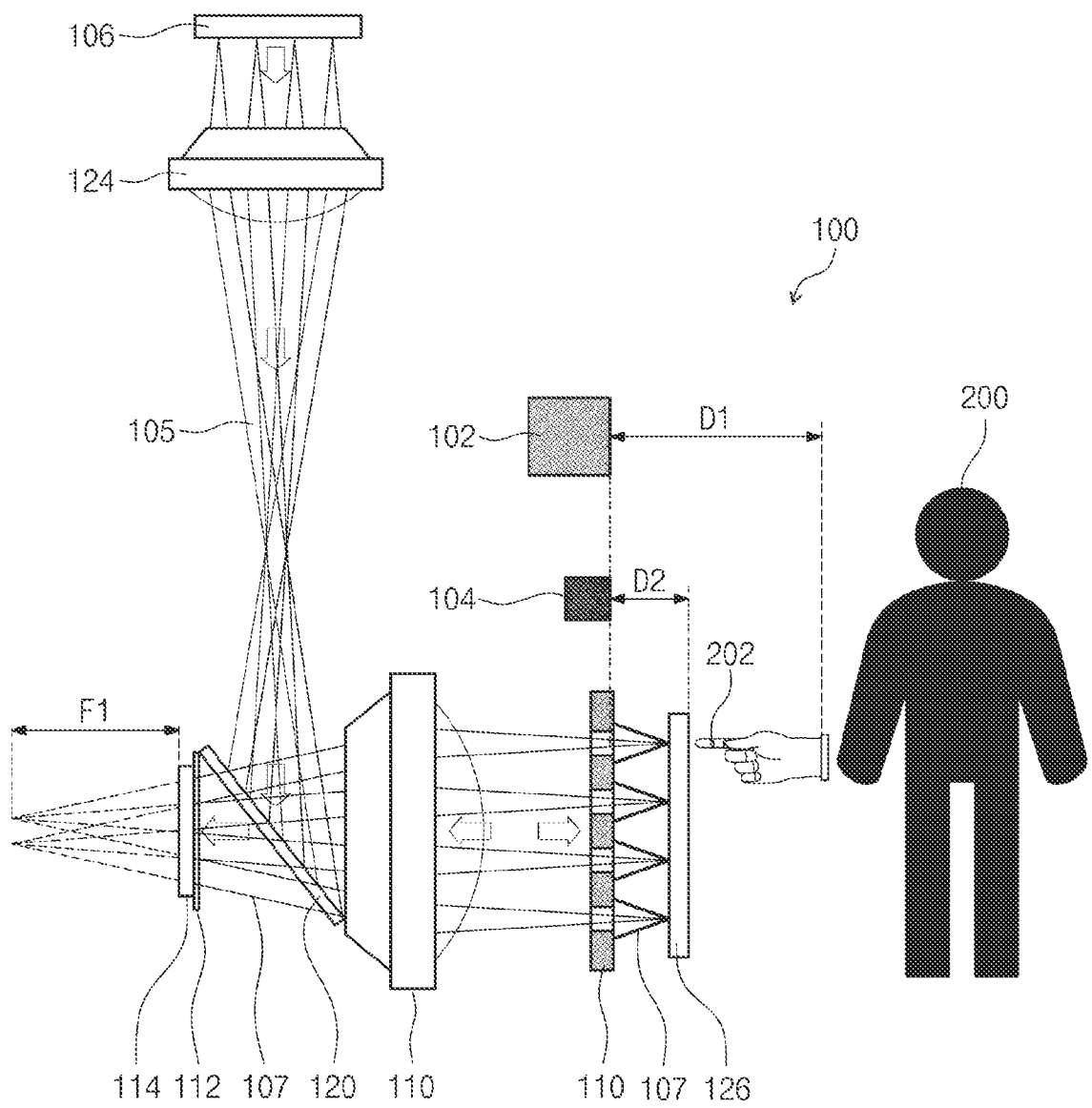

FIGS. 8 and 9 are a block diagram and a cross-sectional view illustrating an example of the air screen detector device 100 according to an embodiment of the inventive concept.

Referring to FIGS. 8 and 9, the air screen detector device 100 according to an embodiment of the inventive concept may further include a beam splitter 120 and a second multifocal lens 124 between the display 160 and the first multifocal lens 110. The display 106 may be separated from the infrared light source 108. The display 106 may display the air screen image 126 at an outside of the infrared light source 108 by using the visible light 105 through the second multifocal lens 124, the beam splitter 120, and the first multifocal lens 110.

The beam splitter 120 may be disposed between the display 106 and the first multifocal lens 110. The beam splitter 120 may reflect the visible light 105 to the first multifocal lens 110. The beam splitter 120 may be disposed between the visible light filter 112 and the first multifocal lens 110. The beam splitter 120 may transmit the infrared light 107 through the visible light filter 112.

The second multifocal lens 124 may be disposed between the beam splitter 120 and the display 106. The second multifocal lens 124 may project the visible light 105 in the display areas 109 of the display 106 to the beam splitter 120. The visible light 105 may display the air screen image 126 by passing through the first multifocal lens 110 and the infrared light source 108.

The first ultrasonic sensor 102, the second ultrasonic sensor 104, the infrared light source 108, the first multifocal lens 110, the visible light filter 112, the infrared image sensor 114, the amplifier 116, and the signal processor 118 may be the same as those in FIGS. 1 and 2.

Figure 10:
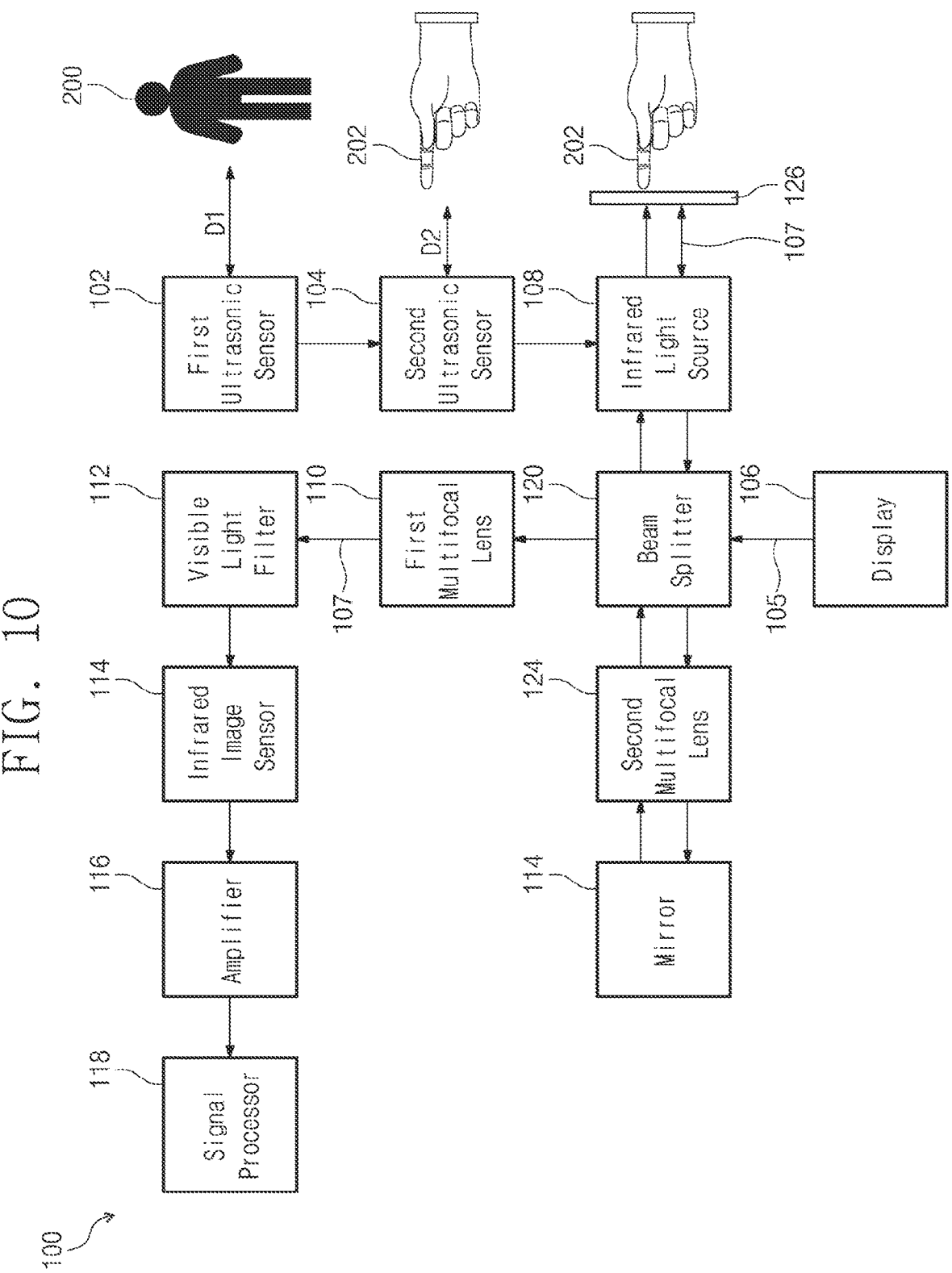
FIGS. 10 and 11 are a block diagram and a cross-sectional view illustrating an example of the air screen detector device according to an embodiment of the inventive concept.
Figure 11:
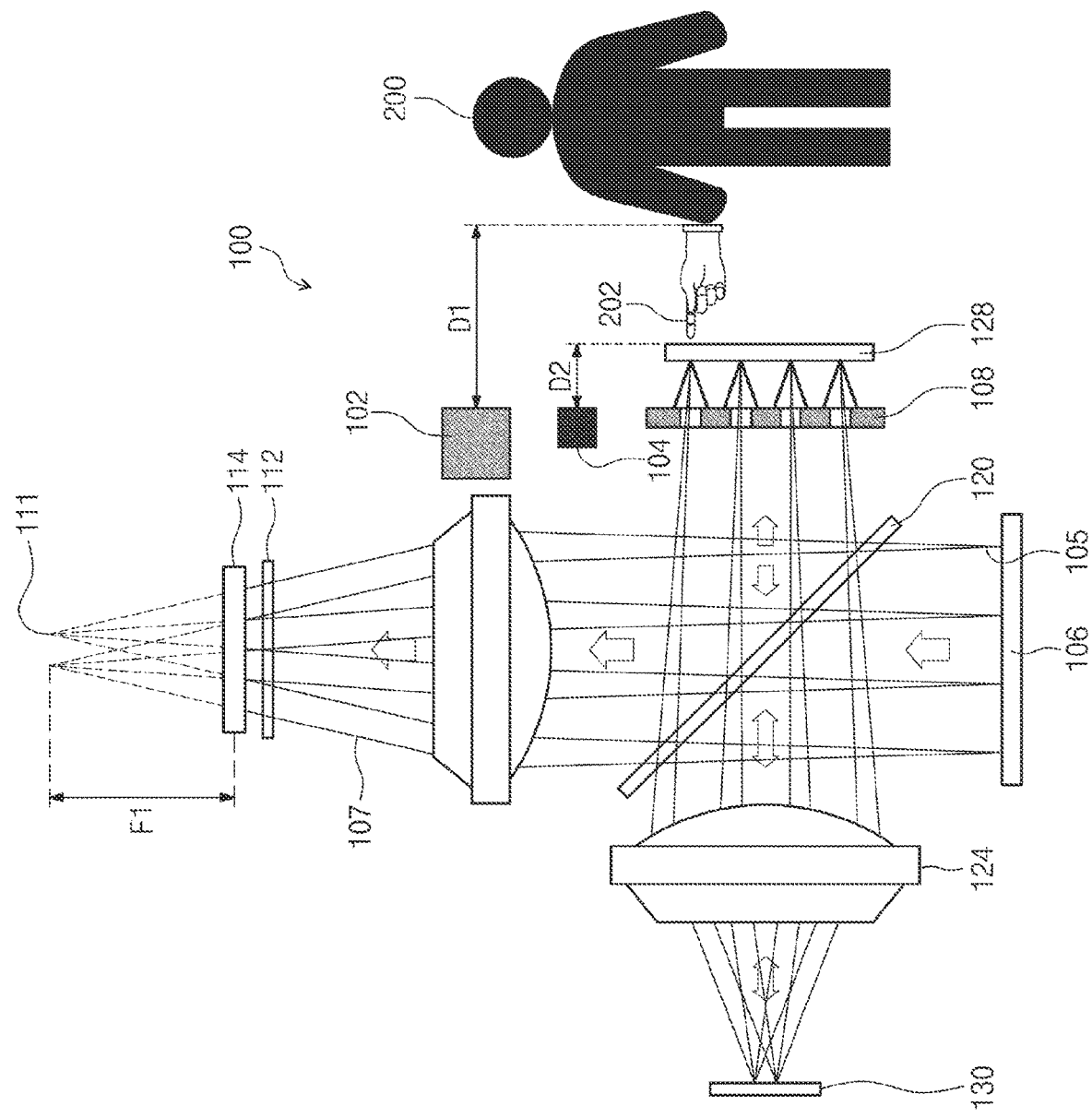

FIGS. 10 and 11 are a block diagram and a cross-sectional view illustrating an example of the air screen detector device 100 according to an embodiment of the inventive concept.

Referring to FIGS. 10 and 11, the air screen detector device 100 according to an embodiment of the inventive concept may further include a mirror 130 for reflecting the visible light 105 of the display 106 to the user 200.

The display 106 may be disposed adjacent to the beam splitter 120. For example, the display 106, the infrared light source 108, the first multifocal lens 110, and the second multifocal lens 124 may surround the beam splitter 120 with a rectangular shape. The display 106 may provide the visible light 105 to the beam splitter 120, the second multifocal lens 124, and the mirror 130.

The beam splitter 120 may be disposed between the display 106 and the first multifocal lens 110. Also, the beam splitter 120 may be disposed between the display 106 and the second multifocal lens 124. The beam splitter 120 may reflect the visible light 105 of the display 106 to the second multifocal lens 124. The beam splitter 120 may be disposed between the second multifocal lens 124 and the infrared light source 108. When the mirror 130 reflects the visible light 105, the visible light 105 may display the air screen image 126 by passing through the second multifocal lens 124, the beam splitter 120, and the infrared light source 108. The beam splitter 120 may be disposed between the infrared light source 108 and the first multifocal lens 110. When the infrared light 107 is reflected by the finger 202 in the air screen image 126, the beam splitter 120 may reflect the infrared light 107 to the first multifocal lens 110, the visible light filter 112, and the infrared image sensor 114.

The second multifocal lens 124 may be disposed between the beam splitter 120 and the mirror 130. The second multifocal lens 124 may project the visible light 105 to the mirror 130. The second multifocal lens 124 may individually focus the visible light 105 of each of the display areas 109 (refer to FIG. 4A) to the mirror 130.

The mirror 130 may be disposed on one side of the second multifocal lens 124. The mirror 130 may reflect the visible light 105 of the display 106 to the second multifocal lens 124, the beam splitter 120, and the infrared light source 108. The visible light 105 may display the numbers and/or the symbols of the display areas 109 of the display 106 as the air screen image 126.

The first ultrasonic sensor 102, the second ultrasonic sensor 104, the infrared light source 108, the first multifocal lens 110, the visible light filter 112, the infrared image sensor 114, the amplifier 116, and the signal processor 118 may be the same as those in FIGS. 1 and 2.

As described above, the air screen detector device according to the embodiment of the inventive concept may obtain the number touched by the finger in the non-contact method by using the multifocal lens, the visible light filter, and the infrared image sensor, which detect the infrared light reflected by the finger.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. An air screen detector device comprising:
    a display configured to display an air screen image in one direction using visible light;
    an infrared light source disposed on the display to provide infrared light in the same direction as that of the visible light;
    an infrared image sensor disposed on one side of the display and the infrared light source to receive the infrared light reflected by a finger provided in the air screen image disposed on the other side of the infrared light source;
    a first multifocal lens disposed between the infrared image sensor and the infrared light source to provide the infrared light to the infrared image sensor; and
    a visible light filter disposed between the first multifocal lens and the infrared image sensor to remove the visible light.

2. The air screen detector device of claim 1, wherein the display has display areas, and
    the infrared light source is disposed between the display areas.

3. The air screen detector device of claim 2, wherein the infrared light source has holes configured to individually expose the display areas.

4. The air screen detector device of claim 3, wherein the infrared light source has a net shape that includes the holes.

5. The air screen detector device of claim 1, further comprising a beam splitter disposed between the visible light filter and the first multifocal lens or between the first multifocal lens and the infrared light source.

6. The air screen detector device of claim 5, further comprising a second multifocal lens disposed between the beam splitter and the display.

7. The air screen detector device of claim 6, wherein the beam splitter is disposed between the second multifocal lens and the display.

8. The air screen detector device of claim 7, further comprising a mirror disposed on one side of the second multifocal lens, which is opposite to the beam splitter, to reflect the visible light to the second multifocal lens.

9. The air screen detector device of claim 6, wherein the display, the infrared light source, the first multifocal lens, and the second multifocal lens surround the beam splitter in all directions.

10. The air screen detector device of claim 1, further comprising:
    a first ultrasonic sensor configured to detect a user within a first distance; and
    a second ultrasonic sensor disposed between the first ultrasonic sensor and the infrared light source to detect the finger of the user within a second distance less than the first distance.

11. The air screen detector device of claim 1, further comprising:
    an amplifier connected to the infrared image sensor; and
    a signal processor connected to the amplifier.

* * * * *